United States Patent [19]

Moon, Jr.

[11] 3,861,224
[45] Jan. 21, 1975

[54] FLEXURE MEANS FOR A CONTROL DEVICE OR THE LIKE

[75] Inventor: William T. Moon, Jr., Knoxville, Tenn.

[73] Assignee: Robertshaw Controls Company, Richmond, Va.

[22] Filed: June 27, 1973

[21] Appl. No.: 374,110

[52] U.S. Cl. .............................................. 74/17.8
[51] Int. Cl. ............................................ F16j 15/50
[58] Field of Search .............. 74/17.8, 18.1; 403/50, 403/51

[56] References Cited
UNITED STATES PATENTS

| | | | |
|---|---|---|---|
| 2,099,244 | 11/1937 | Temple | 74/17.8 |
| 2,740,858 | 4/1956 | Euler | 74/17.8 |
| 2,860,933 | 11/1958 | Wolff | 74/17.8 |
| 2,863,336 | 12/1958 | Parstorfer | 74/17.8 |
| 3,061,823 | 10/1962 | Crossley, Jr. | 74/17.8 |
| 3,190,227 | 6/1965 | Davids et al. | 74/17.8 |

*Primary Examiner*—Wesley S. Ratliff, Jr.
*Attorney, Agent, or Firm*—Candor, Candor & Tassone

[57] ABSTRACT

A flexure means for a control device having a movable part and a control part to be moved in accordance with movement of the movable part, the control device having a motion transmitting member provided with one end being interconnected to the movable part to be moved thereby and the other end being interconnected to the control part to move the same. The flexure means is carried by the control device and is interconnected to the motion transmitting member to pivotally mount that member intermediate its ends thereof to the control device to thereby cause the member to pivot as the movable part moves and transmit such movement to the control part, the flexure means comprising a one-piece metallic part having an opening passing there-through and receiving the control member therein to pivotally mount the control member to the control device. Other openings pass through the flexure part adjacent to the first opening thereof to create flexure areas in the flexure part adjacent the main opening thereof to compensate for misalignment and/or rotational movement of the motion transmitting member relative thereto.

19 Claims, 6 Drawing Figures

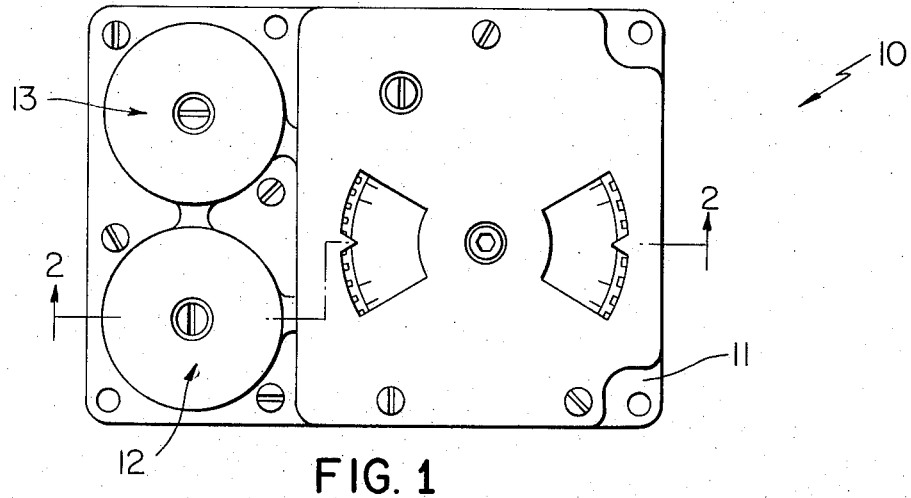
FIG. 1
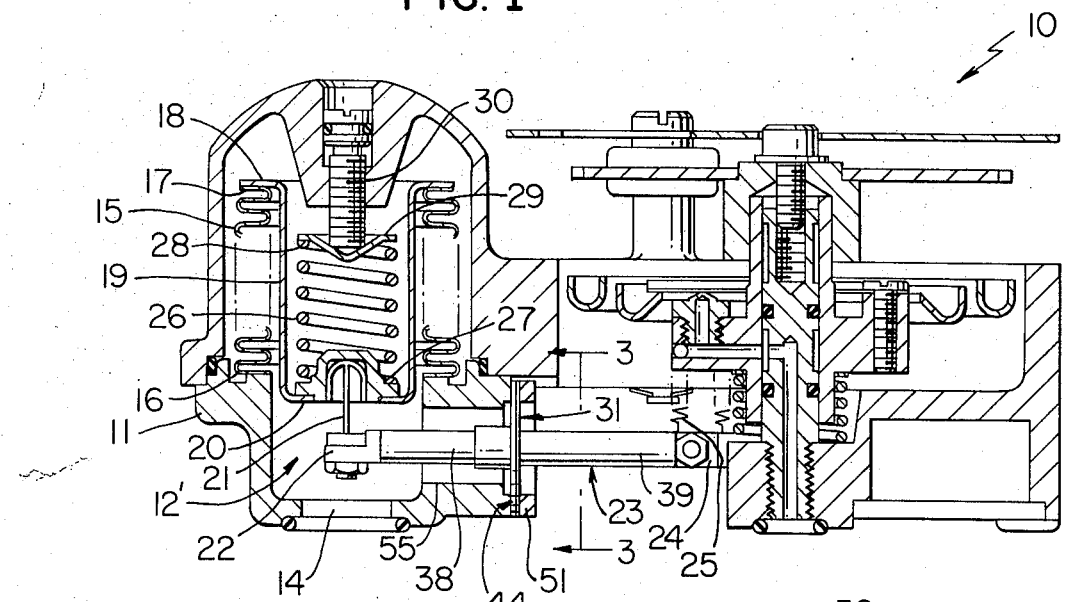
FIG. 2
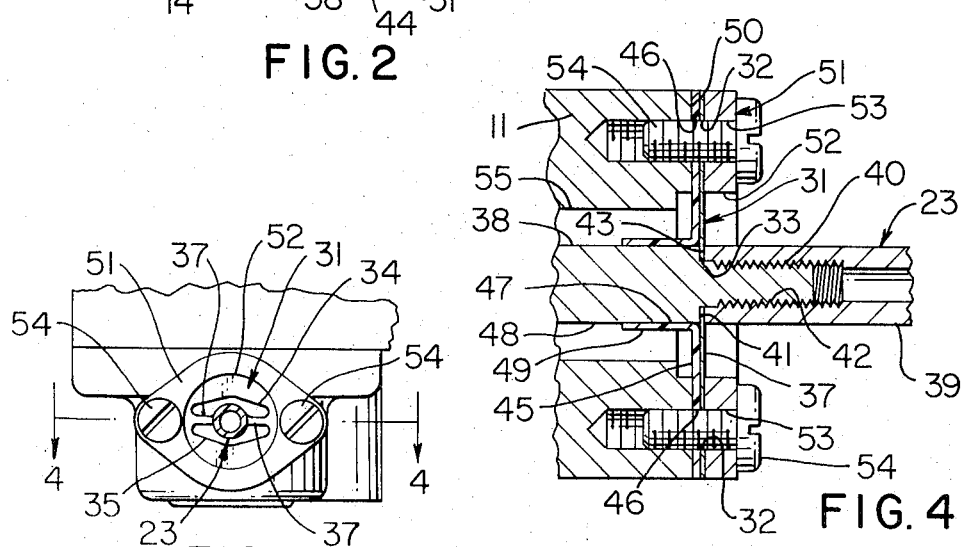

FLEXURE MEANS FOR A CONTROL DEVICE OR THE LIKE

This invention relates to an improved flexure member for pivotally mounting a motion transmitting member to a control device or the like.

It is well known that control devices have been provided where each has a movable part that moves in accordance with a condition being sensed thereby and such motion of the movable part is to create a corresponding movement of a control part of the control device. Thus, some means must be provided for transmitting the motion of the movable part to the control part so that the same will be moved as the movable part is being moved by the condition being sensed thereby.

Accordingly, it is a feature of this invention to provide a flexure member that can be carried by the control device and will pivotally mount a motion transmitting member to the control device so that one end of the motion transmitting member can be interconnected to the movable part and the other end of the motion transmitting member can be interconnected to the control part.

In particular, one embodiment of this invention provides a control device having a movable means and a control part to be moved in accordance with movement of the movable means, the control device having a motion transmitting member having opposed ends one of which is interconnected to the movable means to be moved thereby and the other end being interconnected to the control part to move the same. The flexure means of this invention is carried by the device and is interconnected to the motion transmitting member to pivotally mount the motion transmitting member intermediate the ends thereof to thereby cause the motion transmitting member to pivot as the movable means moves and transmits such movement to the control part. The flexure means comprises a one piece part having an opening passing therethrough and receiving the control member therein to pivotally mount the control member to the device. The flexure means can comprise a one piece part formed of metal or any other suitable material having other opening means passing therethrough adjacent to the main opening to create flexure areas in the one piece part adjacent the main opening thereof whereby the flexure areas not only permit the pivotal movement of the motion transmitting member but also permit angular movement thereof to compensate for misalignment between the operating parts of the control device.

In addition, a seal means of this invention can be utilized with such flexure member to permit the motion transmitting member to be received within a pressure chamber of the control device and be interconnected to the movable part thereof with such sealing means being disposed in stacked relation with the flexure member as will be apparent hereinafter.

Accordingly, it is an object of this invention to provide an improved control device having one or more of the novel features set forth above or hereinafter shown or described.

Another object of this invention is to provide an improved flexure member for such a control device or the like, the flexure member of this invention having one or more of the novel features set forth above or hereinafter shown or described.

Other objects, uses and advantages of this invention are apparent from a reading of this description, which proceeds with reference to the accompanying drawings wherein:

FIG. 1 is a top view of the improved control device of this invention.

FIG. 2 is an enlarged, cross-sectional view taken on line 2—2 of FIG. 1.

FIG. 3 is a fragmentary, cross-sectional view taken on line 3—3 of FIG. 2.

FIG. 4 is an enlarged, fragmentary, crosssectional view taken on line 4—4 of FIG. 3.

Figure 5:
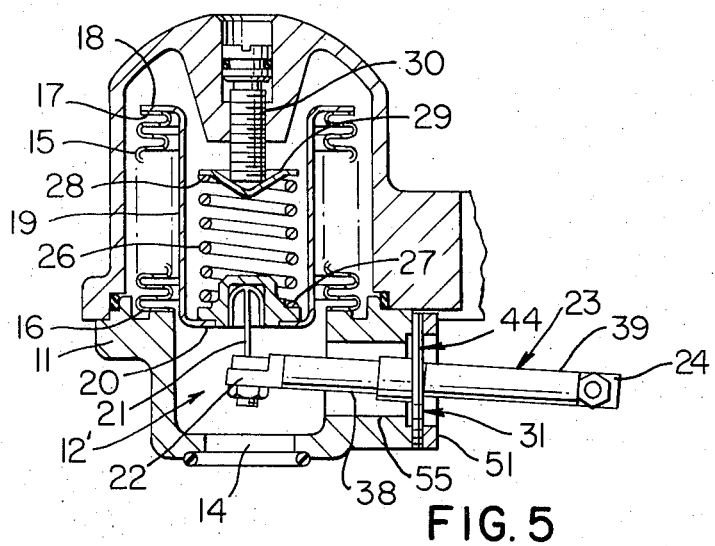
FIG. 5 is a fragmentary view similar to FIG. 2 and illustrating the motion transmitting member in another operating position thereof.

While the various features of this invention are hereinafter described and illustrated as providing a flexure member for a pressure operated control device, it is to be understood that the various features of this invention can be utilized singly or in any combination thereof to provide motion transmitting means for other types of control devices as desired.

Therefore, this invention is not to be limited to only the embodiment illustrated in the drawings, because the drawings are merely utilized to illustrate one of the wide variety of uses of this invention.

Referring now to FIGS. 1 and 2, the improved control device of this invention is generally indicated by the reference numeral 10 and comprises a housing structure 11 having one or more pressure elements that are generally indicated by the reference numerals 12 and 13 in FIG. 1 and respectively having pressure receiving chambers 12' provided therein with each pressure chamber 12' having an inlet 14 leading thereto and being defined in part by an expandable and contractible tubular bellows 15. Other inlets (not shown) are respectively provided for each pressure element 12 and 13 and respectively lead to the chambers outside the bellows 15 whereby pressure fluid can be directed inside and outside each bellows 15 so that the resulting pressure differential across the same will cause movement of the particular bellows 15 as will be apparent hereinafter. Each bellows 15 has its lower end 16 secured to the housing support 11 and the upper end 17 thereof closed by an outwardly flared end 18 of a cup-shaped member 19 telescoped within the bellows construction 15 and having a closed end 20 interconnected by a flexible tying member 21 to one end 22 of a motion transmitting member 23, the other end 24 of the motion transmitting member being interconnected to a control part 25 of the control device 10 that will be moved in accordance with movement of the movable wall 20 of the control device 11.

While the control part 25 of the control device 10 can comprise any suitable structure, the particular control device 10 illustrated in the drawings has the control part 25 thereof controlling a flapper valve member in relation to a vent nozzle in a manner conventional in the art whereby it is not necessary to describe in detail such structure as it is well known that flapper valve members are respectively positioned relative to their associated nozzles in accordance with movement of a movable part of the control device that is sensing a certain condition.

In the control device 10 of this invention, it can be seen that as the pressure differential across the movable wall 20 changes, the movable wall 20 will be moved by such change in the pressure differential across the same upwardly or downwardly as the case may be to cause pivoting of the motion transmitting member 23 in a manner hereinafter described to thereby cause movement of the control part 25 in accordance with movement of the movable wall 20 of the bellows construction 15.

A compression spring 26 has one end 27 bearing against the movable wall 20 and its other end 28 bearing against a retainer 29 that is adjusted relative to the movable wall 20 by a threaded adjusting member 30 carried by the housing structure 11. Thus, as the pressure in the chamber 12' of the control device 10 increases, the resulting change in pressure differential across the wall 20 causes the wall 20 to move upwardly in opposition to the force of the compression spring 28 in the manner illustrated in FIG. 5 to cause clockwise pivoting of the motion transmitting member 23 and, conversely, when the pressure in the chamber 12' drops, the resulting decrease in pressure differential across the wall 20 permits the spring 26 to move the wall 20 downwardly in opposition to the force of the pressure fluid in the chamber 12' to thereby pivot the motion transmitting member 23 in a counterclockwise direction.

In order to permit the motion transmitting member 23 to be so pivotally mounted to the housing structure 11 of the control device 10, a one piece metallic flexure means or member of this invention is utilized and is generally indicated by the reference numeral 31 in the drawings.

It has been found that the flexure member 31 of this invention can be formed of a stainless steel material, MS-480-S, of Type 302, full hard, and be approximately 0.012 of an inch in thickness when the distance between the center of a pair of mounting holes 32 formed therethrough is approximately 0.718 of an inch.

However, it is to be understood that the flexure means or member 31 of this invention could be formed of other suitable materials, such as plastic and the like, depending on the forms involved.

The flexure member 31 can be suitably stamped from such a sheet of material to provide not only the mounting openings 32, but also to provide a central opening 33 passing therethrough which will telescopically receive an intermediate part of the motion transmitting member 23 in a manner hereinafter described. In addition, a pair of oblong, like openings 34 and 35 are also formed through the flexure member 31 adjacent the main opening 33 to define a substantially annular central section 36 surrounding the main opening 33 and being interconnected to the remainder of the flexure member 31 by a pair of opposed narrow arms 37 respectively radiating outwardly from the annular central section 36 along a line that passes through the centers of the fastening holes 32 for a purpose hereinafter described.

Thus, it can be seen that the openings 34 and 35 formed through the flexure member 31 create flexure areas 37 adjacent the main opening 33 to permit the annular central section 36 to not only rotate about an axis disposed along a straight line passing through the centers of the fastening holes 32 in opposition to the torsion effect of the arms 37 to permit pivoting of the motion transmitting member 23 in the manner illustrated in FIG. 5, but also such narrow arms 37 act as leaf springs to permit the annular section 36 to be rotated out of the plane of the flexure member 31 along a line disposed transverse to the line between the centers of the fastening holes 32 to compensate for slight misalignment between the tying part 21 of the movable wall 20 and the control part 25 of the control device 10 when the motion transmitting member 23 is being assembled to the parts 20 and 25.

The motion transmitting member 23 of this invention comprises two parts 38 and 39 adapted to be interconnected together, the part 38 having a reduced externally threaded cylindrical portion 40 extending outwardly from the end 41 thereof and being adapted to just pass through the main opening 33 of the flexure member 31 in the manner illustrated in FIG. 4 and be threadedly received within an internally threaded bore 42 formed in the end 43 of the other part 39 of the motion transmitting member 23.

Thus, when the threaded portion 40 of the part 38 of the motion transmitting member 23 is received through the opening 33 of the flexure member 31 and threaded into the threaded bore 42 of the other part 39 of the motion transmitting member 23 in the manner illustrated in FIG. 4, the annular central part 36 of the flexure member 31 is stacked between the ends 41 and 43 of the parts 38 and 39 so as to be directly fastened to an intermediate part of the motion transmitting member 23 whereby the pivoting action of the motion transmitting member 23 is caused by flexing of the flexure member 31 at the arms 37 thereof in a torsional manner as previously described about an axis disposed along a line passing through the centers of the fastening openings 32 of the flexure member 31.

Of course, it is to be understood that the parts 38 and 39 of the motion transmitting member 23 could be fastened together by means other than the threaded relation previously described and still function in the same manner. For example, the parts 38 and 39 could be bonded together, press fitted together, etc., and still capture the flexure member therebetween.

Since the end 22 of the motion transmitting part 23 is projecting into the pressure chamber 12 of the control device 10, some means must be provided to seal the chamber 12 of the flexure member 31, and, preferably, in such a manner that the sealing means will not effect the motion of the motion transmitting member 23 upon a pressure change in the pressure chamber 12 of the control device 10.

Figure 6:
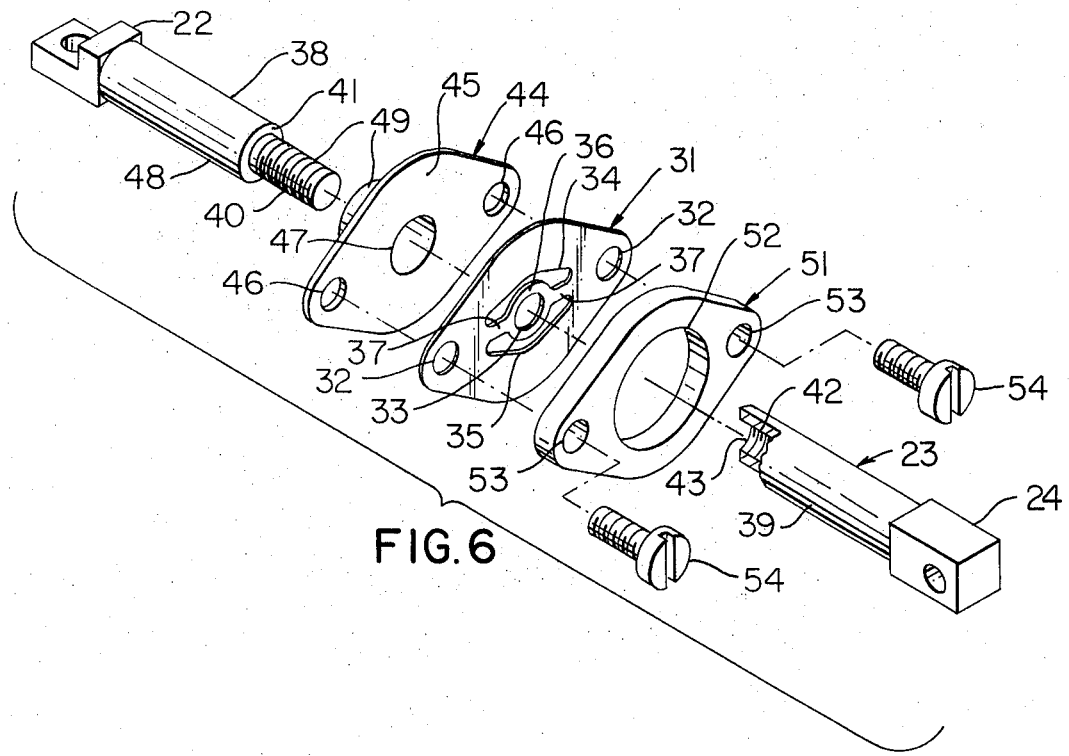
FIG. 6 is an exploded perspective view of the motion transmitting member, flexure member and diaphragm seal of this invention.

Accordingly, a flexible diaphragm of this invention is provided and is generally indicated by the reference numeral 44 in the drawings. The flexible diaphragm 44 has a flat part 45 shaped similarly to the shape of the flexure member 31 and is provided with a pair of mounting holes 46 adapted to be disposed in alignment with the mounting holes 32 of the flexure member 31 in the manner illustrated in FIGS. 4 and 6. The flexible diaphragm 44 also has an opening 47 passing centrally therethrough to be axially aligned with the main opening 33 of the flexure member 31 but being of a larger diameter so as to telescopically receive the larger cylindrical section 48 of the part 38 of the motion transmitting member 23 in the manner illustrated in FIG. 4.

The flexible diaphragm 44 is also provided with a tubular portion 49 projecting outwardly from the same and being in alignment with the central opening 47 thereof so that the tubular part 49 will be disposed closely about the cylindrical section 48 of the motion transmitting member 23 in the manner illustrated in FIG. 4 to fully fluid seal around the cylindrical part 48 thereof at the opening 47 of the diaphragm 44 and, thus, at the openings 33, 34 and 35 of the flexure member 31.

An annular housing member is provided for mounting the flexure member 31 and diaphragm 44 in stacked relation against an end wall 50 of the housing structure 11 and such housing member is generally indicated by the reference numeral 51. The housing member 51 has an enlarged opening 52 passing centrally therethrough and is of such a size that the housing member 51 will not be placed in engagement with the flexure parts 37 and annular central part 36 of the flexure member 31 when disposed in stacked relation against the same as is apparent when viewing FIGS. 3 and 4. The housing part 51 also has mounting holes 53 passing therethrough to be disposed in alignment with the mounting holes 32 of the flexure member 31 and the mounting holes 46 of the flexible diaphragm 44 so that threaded fastening member 54 can be utilized to fasten the parts 44, 31 and 51 in stacked relation against the end wall 50 of the housing structure 11 in the manner illustrated in FIG. 4 to completely fluid seal the passage means 55 of the housing structure 11 that leads from the end wall 50 to the pressure chamber 12' as illustrated.

Therefore, it can be seen that this invention provides a relatively simple method for pivotally mounting the motion transmitting member 23 to the housing structure 11 and effectively fluid seal the chamber 12' from the exterior of the housing structure 11 at the pivotally mounting portion of the motion transmitting member 23.

As previously stated, when the control device 23 is being mounted to the housing structure 11 by the flexure member 31, diaphragm 44 and the housing member 51, and a misalignment should occur between the tying means 21 of the movable wall 20 of the control device 10, the flexure member 31 can be slightly flexed in either a rotational direction along a line passing through the centers of the openings 32 of the flexure member 31 and/or along a line passing transverse to the line passing through the centers of the fastening openings 32 as the flexure arms 37 of the flexure member 31 will permit such rotation of the annular central part 36 of the flexure member 31 in much the same manner as a universal joint.

In the operation of the control device 10, it can be seen that as the pressure in the chamber 12' increases, the movable wall 20 will move upwardly in FIG. 2 in opposition to the force of the spring 26 to the position illustrated in FIG. 5 and thereby cause a clockwise pivoting action of the motion transmitting part 23 as the annular central part 36 of the flexure member 31 that is captured between the parts 38 and 39 of the motion transmitting member 23 will rotate by a twisting action of the arms 37 about an axis that is disposed along a line passing through the centers of the fastening openings 32 of the flexure member 31. A decrease in pressure in the chamber 12' will cause the spring 26 to move the wall 20 downwardly and thereby cause the motion transmitting member 23 to pivot in a counterclockwise direction in the drawings as the annular central part 36 of the flexure member 31 will rotate in a counterclockwise direction along the previously described axis that is disposed along a line passing through the centers of the fastening openings 32 of the flexure member 31.

Because the diaphragm 44 has the major portion thereof disposed against the non-recessed portion of the flexure member 31 so that only the part of the diaphragm 44 that is adjacent the openings 34 and 35 in the flexure member 31 is unsupported by the flexure member 31, the diaphragm 44 can be made of a very thin wall elastomer material without the need of fabric reinforcement thereof so that the cost thereof can be held relatively low. This feature also holds the effect of the diaphragm 44 on the system rate and hysteresis to a minimum value for the control device 10 while still providing a fluid seal for the chamber 12' that permits the flexure member 31 to cause the motion transmitting member 23 to transmit motion without the takeup of any lost motion in the pivot action.

Accordingly, it can be seen that this invention not only provides an improved control device, but also this invention provides an improved flexure member for such a control device or the like.

While the form of the invention now preferred has been described and illustrated as required by the Patent Statute, it is to be understood that other forms can be utilized and still come within the scope of the appended claims.

What is claimed is:

1. In a control device having a movable means and a control part to be moved in accordance with movement of said movable means, the improvement comprising a motion transmitting member having opposed ends, one of said ends of said member being interconnected to said movable means to be moved thereby, the other end of said member being interconnected to said control part to move the same, and flexure means carried by said device and being interconnected to said member to pivotally mount said member intermediate said ends thereof to thereby cause said member to pivot as said movable means moves and transmit such movement to said control part, said flexure means comprising a one-piece part having an opening therethrough receiving said control member therein to pivotally mount said control member to said device, said one-piece part having opening means passing therethrough adjacent to said opening to create flexure area means of said one-piece part adjacent said opening thereof.

2. In a control device as set forth in claim 1, said flexure means comprising a metallic one-piece part.

3. In a control device as set forth in claim 1, said opening means defining a substantially annular center section of said one-piece part having said opening passing therethrough and flexure connecting means of said one-piece part interconnecting said annular center section to the remainder of said one-piece part.

4. In a control device as set forth in claim 3, said flexure connecting means of said one-piece part comprising a pair of flexure arms disposed on opposite sides of said annular control section and radiating outwardly therefrom to the remainder of said one-piece part.

5. In a control device as set forth in claim 4, said flexure arms each having a width narrower than the diameter of said annular center section.

6. In a control device as set forth in claim 4, said flexure arms being disposed in a generally straight line that is generally transverse to the direction of pivot of said control member.

7. In a control device as set forth in claim 1, said movable means of said control device comprising a movable wall defining in part a fluid receiving chamber of said device whereby said movable wall moves in accordance with changes in pressure differential across the same.

8. In a control device as set forth in claim 7, said one end of said control member being received in said chamber, and sealing means carried by said control device for sealing around said control member to fluid seal said chamber at said control member.

9. In a control device as set forth in claim 8, said sealing means comprising a flexible diaphragm having an opening passing therethrough and receiving said control member therein.

10. In a control device as set forth in claim 9, said diaphragm having a tubular portion aligned with said opening thereof and through which said control member is disposed.

11. In a control device as set forth in claim 10, said diaphragm and said one-piece flexure part are disposed in stacked relation.

12. In a control device as set forth in claim 1, said control member having means clamping to said one-piece flexure part outboard of said opening thereof.

13. In a control device as set forth in claim 12, said control member comprising two parts interconnected together to form a joint area therebetween, said one-piece flexure part being clamped between said parts at said joint area.

14. In a control device as set forth in claim 13, one of said parts of said control member having an externally threaded reduced end passing through said opening of said one-piece flexure part and the other part of said control member having an internally threaded end receiving said threaded reduced end to interconnect said parts of said control member together.

15. A one-piece flexure member for pivotally mounting a control member to a control device or the like, said flexure member having means for being secured to said device and having an opening passing therethrough for receiving an intermediate part of said control member to pivotally mount said control member to said device, said flexure member having opening means passing therethrough adjacent to said opening to create flexure area means of said flexure member adjacent said opening thereof.

16. A flexure member as set forth in claim 15 wherein said opening means define a substantially annular center section of said one-piece flexure member having said opening passing therethrough and flexure connecting means of said one-piece flexure member interconnecting said annular center section to the remainder of said one-piece flexure member.

17. A flexure member as set forth in claim 16 wherein said flexure connecting means of said one-piece part comprise a pair of flexure arms disposed on opposite sides of said annular central section and radiating outwardly therefrom to the remainder of said one-piece flexure member.

18. A flexure member as set forth in claim 17 wherein said flexure arms each has a width narrower than the diameter of said annular center section.

19. A flexure member as set forth in claim 18 wherein said flexure arms are disposed in a generally straight line that is adapted to be generally transverse to the direction of pivot of said control member.

* * * * *